United States Patent
Nagai et al.

(10) Patent No.: US 6,373,724 B2
(45) Date of Patent: Apr. 16, 2002

(54) POWER SUPPLY APPARATUS

(75) Inventors: Tamiji Nagai, Kanagawa; Tamon Ikeda, Tokyo; Kazuo Yamazaki, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/817,635

(22) Filed: Mar. 26, 2001

(30) Foreign Application Priority Data

Mar. 27, 2000 (JP) ........................................ 2000-086884

(51) Int. Cl.[7] .............................................. H02M 3/335
(52) U.S. Cl. ...................................................... 363/20
(58) Field of Search .............................. 363/16, 18, 20, 363/55, 56.01, 95, 97, 131

(56) References Cited

U.S. PATENT DOCUMENTS 5,991,170 A * 11/1999 Nagai et al. .................. 363/20
6,288,914 B1 * 9/2001 Sato .............................. 363/18
6,295,217 B1 * 9/2001 Yang et al. .................... 363/49

* cited by examiner

Primary Examiner—Matthew Nguyen
(74) Attorney, Agent, or Firm—Frommer Lawrence & Haug LLP; William S. Frommer (57) ABSTRACT

A rectified commercially available power source is supplied to one end of a primary coil T1 of a transformer T through a terminal TM1. A capacitor C for rectifying is provided between the terminal TM1 and the ground. A switching device X is provided between the other end of the primary coil T1 and the ground. A power source obtained from a terminal TM3 is supplied as a power source for driving oscillators O1 and O2, PWM circuits P1 and P2, and a driving circuit D. The oscillator O1 supplies a signal based on a preset frequency f1 to the circuit P1. In the circuit P1, a switching signal having a predetermined duty ratio according to the supplied signal is supplied to the circuit D through a switching circuit SW1. In the circuit D, the supplied switching signal is amplified and supplied to a control terminal of the switching device X.

9 Claims, 9 Drawing Sheets

POWER SUPPLY APPARATUS

BACKGROUND OF THE INVENTION

1. Field of the Invention

The invention relates to a power supply apparatus suitable for use in a power supply circuit of a switching type.

2. Description of the Related Art

Hitherto, when a cellular phone or a VTR integrated type digital camera (hereinafter, they are referred to as an electronic apparatus) or the like is charged or when the electronic apparatus operates, an AC adapter for supplying a desired power source from a connected commercially available power source to the electronic apparatus is used. The AC adapter has what is called a standby mode in which it is connected to the commercially available power source even if no electronic apparatus is connected. Although the electronic apparatus is not connected, even when a power source is hardly supplied from the AC adapter to the electronic apparatus since the electronic apparatus does not operate, the AC adapter enters the standby mode. Even in the standby mode, a necessary circuit needs to operate in order to switch an operating mode to a supply mode.

In correspondence to the standby mode, the AC adapter has the supply mode for supplying a power source to the electronic apparatus. The supply mode is a mode which is set when the electronic apparatus is connected or the connected electronic apparatus operates.

To reduce an electric power consumption in the standby mode, in case of the switching type power supply circuit, it is necessary to lower a switching frequency and decrease a duty ratio. In the supply mode, on the other hand, it is necessary to raise a switching frequency and increase a duty ratio. For this purpose, a frequency of one oscillator has been switched hitherto.

Since the oscillator is designed so that it can operate even at a high frequency, an impedance of the oscillator decreases. It is, therefore, necessary to also reduce an impedance of a driving circuit for supplying an output of the oscillator to a switching device. There is consequently a problem of an increase in load electric power.

OBJECTS AND SUMMARY OF THE INVENTION

It is, therefore, an object of the invention to provide a power supply apparatus which can suppress an electric power consumption in a standby mode in a switching type power supply circuit.

According to the first aspect of the invention, there is provided a power supply apparatus for outputting a predetermined power source from a commercially available power source, wherein a primary side of a transformer is provided with first and second oscillators for generating outputs of different frequencies and different duty ratios and a switching unit for switching on the basis of the output of one of the first and second oscillators, a secondary side of the transformer is provided with a rectifying circuit for rectifying an output of the switching unit and forming an output and detecting means for detecting a standby mode and a supply mode, and one of the first and second oscillators is selected in accordance with a result of the detection of the detecting means.

The above and other objects and features of the present invention will become apparent from the following detailed description and the appended claims with reference to the accompanying drawings.

DETAILED DESCRIPTION OF THE PREFERRED EMBODIMENTS

Figure 1:
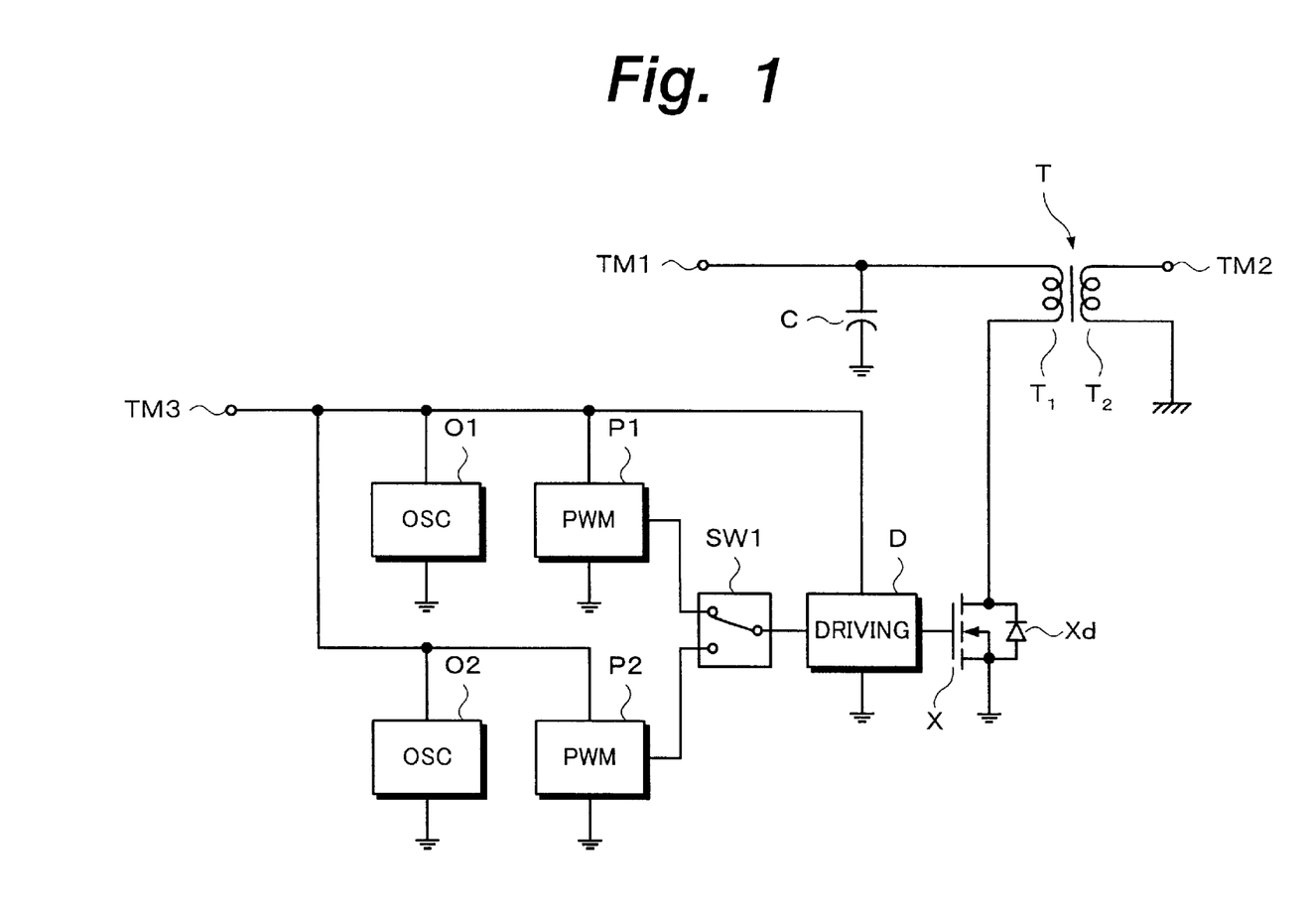
FIG. 1 is a block diagram of the first embodiment to which the invention is applied.

Embodiments of the invention will now be described hereinbelow with reference to the drawings. FIG. 1 shows the first embodiment to which the invention is applied. A rectified commercially available power source is supplied through a terminal TM1 to one end of a primary coil T1 of a transformer T. A capacitor C for rectifying is provided between the terminal TM1 and the ground. A switching device X constructed by, for example, an FET is provided between the other end of the primary coil T1 and the ground. A parasitic diode Xd is provided for the switching device X. A power source obtained by rectifying the commercially available power source is supplied through a terminal TM3.

The power source obtained at the terminal TM3 is supplied as a power source for driving oscillators (OSC) O1 and O2, pulse width modulating (PWM) circuits P1 and P2, and a driving circuit D. The oscillator O1 supplies a preset frequency f1 to the pulse width modulating circuit P1. In the pulse width modulating circuit P1, a switching signal which is set to a predetermined duty ratio in accordance with the supplied frequency f1 is supplied to the driving circuit D through a switching circuit SW1. In the driving circuit D, the supplied switching signal is amplified and supplied to a control terminal of the switching device X.

Similarly, the oscillator O2 supplies a preset frequency f2 to the pulse width modulating circuit P2. In the pulse width modulating circuit P2, a switching signal which is set to a predetermined duty ratio in accordance with the supplied frequency f2 is supplied to the driving circuit D through a switching circuit SW1. In the driving circuit D, the supplied switching signal is amplified and supplied to the control terminal of the switching device X. The switching circuit SW1 is controlled by a control circuit although not shown.

In the first embodiment, the frequency f1 of the oscillator O1 is used in the standby mode and the frequency f2 of the oscillator O2 is used in the supply mode. A relation between the frequencies f1 and f2 is set so as to satisfy f1<f2.

For example, they are selected to f1=20 kHz and f2=200 kHz.

Further, when the duty ratio of the PWM circuit P1 is compared with that of the PWM circuit P2, they are selected so that the duty ratio of the PWM circuit P1 which is used in the standby mode is smaller than the duty ratio of the PWM circuit P2 which is used in the supply mode.

The switching device X is turned on/off in accordance with the switching signal supplied from the driving circuit D. An output of a pulse signal is generated to a secondary coil T2 of the transformer T by the switching operation of the switching device X. A secondary side load comprising a rectifying circuit and a detecting circuit is connected to the secondary coil T2 through a terminal TM2. A detecting unit connected to the terminal TM2 detects whether, for example, an electronic apparatus has been connected or not. In the detecting unit, the apparatus is controlled in a manner such that if it is determined that no electronic apparatus is connected or if it is decided that even when the electronic apparatus has been connected, it does not operate, an operating mode is regarded as a standby mode, and the switching device X is made operative by the output of the oscillator O1. If it is determined in the detecting unit that the electronic apparatus has been connected and is operating, the operating mode is regarded as a supply mode, and the switching device X is made operative by the output of the oscillator O2.

As mentioned above, in the first embodiment, the electric power consumption can be suppressed by using the oscillator O1 and PWM circuit P1 in the standby mode. The standby mode and supply mode are switched by switching the switching circuit SW1.

Figure 2:
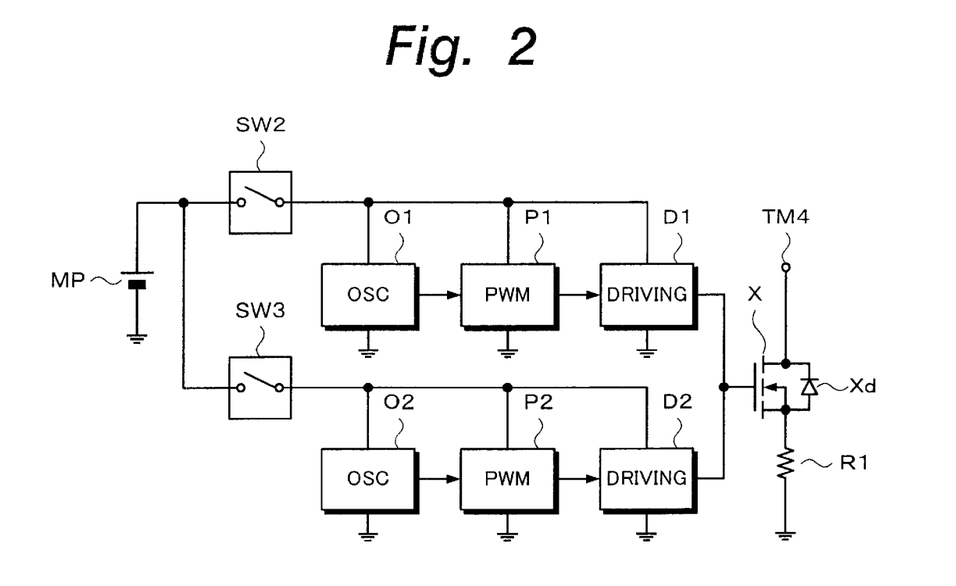
FIG. 2 is a block diagram of the second embodiment to which the invention is applied.

The second embodiment to which the invention is applied will be described with reference to FIG. 2. In the second embodiment, a power source MP is provided as a power source which is supplied to the oscillators O1 and O2, PWM circuits P1 and P2, and driving circuits D1 and D2. The power source MP shows, for example, a power source obtained by rectifying the commercially available power source. The power source MP is connected to switching circuits SW2 and SW3.

One end of the switching device X is connected to a terminal TM4. The terminal TM4 is connected to the other end of the primary coil T1. A resistor R1 is inserted between the other end of the switching device X and the ground.

According to the second embodiment, the switching circuit SW2 is provided for a power supplying path of the oscillator O1, PWM circuit P1, and driving circuit D1 and the switching circuit SW3 is provided for a power supplying path of the oscillator O2, PWM circuit P2, and driving circuit D2. By on/off controlling the switching circuits SW2 and SW3, that is, in dependence on whether the power source is supplied or not, the operation and the stop of the operation each component element are switched. For example, the apparatus is controlled by a control circuit (not shown) in a manner such that when the switching circuit SW2 is ON, the switching circuit SW3 is turned off. Therefore, the oscillator O1, PWM circuit P1, and driving circuit D1 operate, while the operations of the oscillator O2, PWM circuit P2, and driving circuit D2 are stopped. The switching device X is turned on/off by the switching signal which is outputted from one of the driving circuits D1 and D2.

Although the PWM circuit P1 has been provided in the second embodiment, the PWM circuit P1 can be omitted. That is, the output of the oscillator O1 can be supplied to the driving circuit D1.

Figure 3:
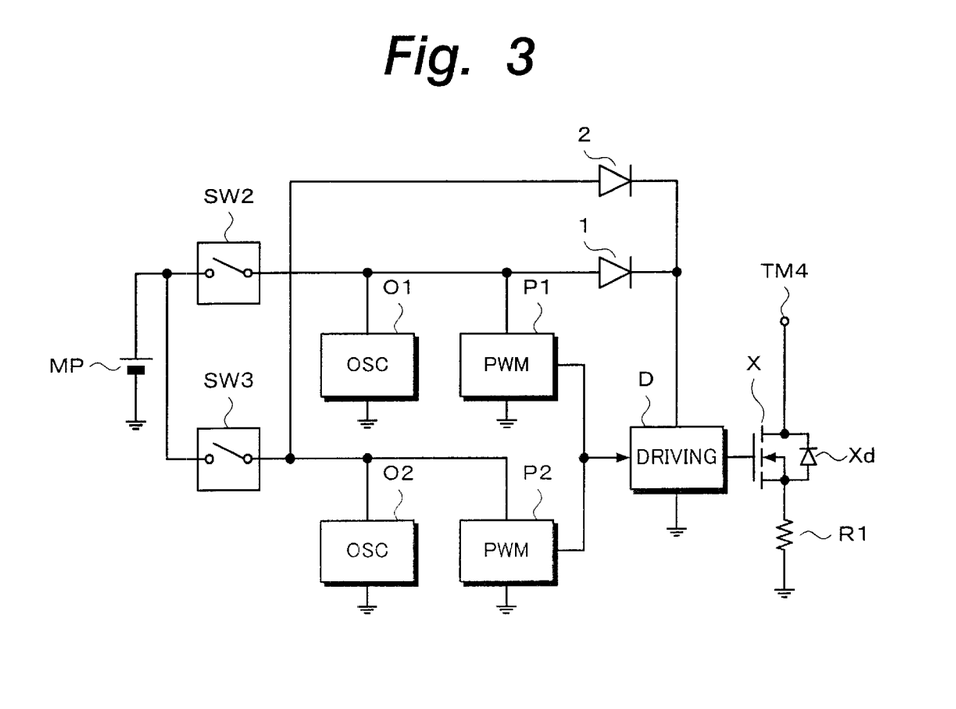
FIG. 3 is a block diagram of the third embodiment to which the invention is applied.

The third embodiment to which the invention is applied will now be described with reference to FIG. 3. According to the third embodiment, in a manner similar to the foregoing second embodiment, the operation and the stop of the operation of the oscillator are switched in dependence on whether the power source is supplied to the oscillator, PWM circuit, and driving circuit or not. In the third embodiment, however, the driving circuit is used in common for the oscillators O1 and O2. The power source is supplied to the driving circuit D even if one of the switching circuits SW2 and SW3 is turned on. Specifically speaking, an anode of a diode 1 is connected to one end of the switching circuit SW2 and its cathode is connected to the driving circuit D. An anode of a diode 2 is connected to one end of the switching circuit SW3 and its cathode is connected to the driving circuit D. The diodes 1 and 2 are provided for prevention of a reverse current.

Figure 4:
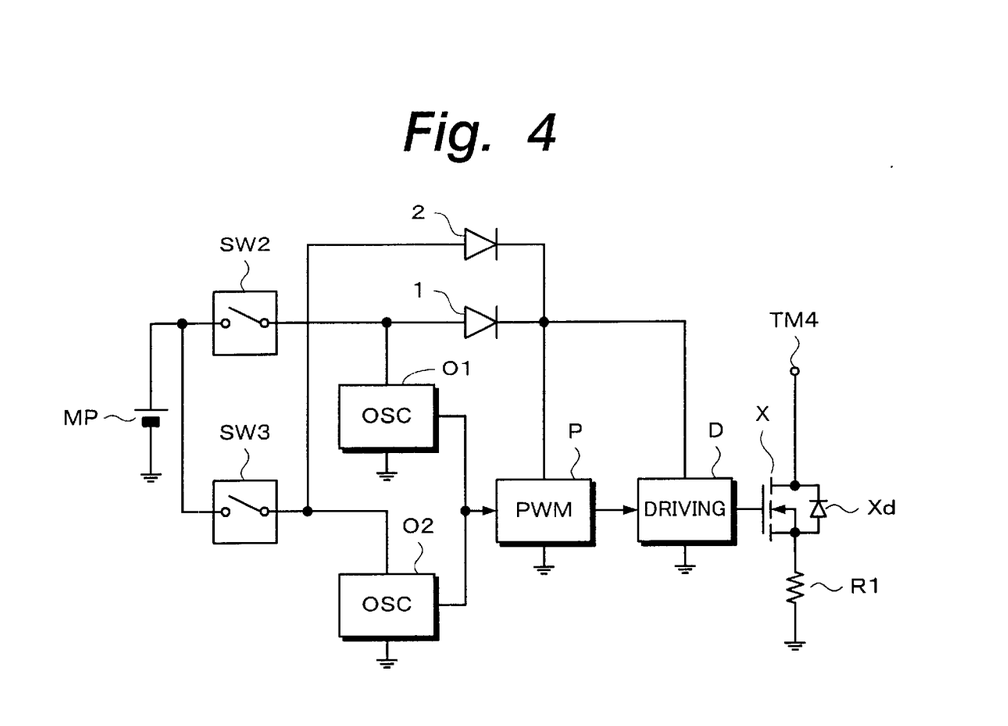
FIG. 4 is a block diagram of the fourth embodiment to which the invention is applied.

The fourth embodiment to which the invention is applied will be described with reference to FIG. 4. In a manner similar to the foregoing second and third embodiments, according to the fourth embodiment, the operation and the stop of the operation of the oscillator are switched in dependence on whether a power source is supplied to the oscillator, PWM circuit, and driving circuit or not. In the fourth embodiment, however, the PWM circuit is used in common for the oscillators O1 and O2. Therefore, the power source is supplied to the PWM circuit P and driving circuit D even if one of the switching circuits SW2 and SW3 is turned on. That is, as shown in FIG. 4, the diodes 1 and 2 are connected to the PWM circuit P and driving circuit D.

According to the fourth embodiment, since only the PWM circuit P is used, the electric power consumption in the standby mode is suppressed only by the setting of the frequency f1 of the oscillator O1 and the frequency f2 of the oscillator O2 unlike the foregoing first to third embodiments in which the electric power consumption in the standby mode is suppressed by the preset frequencies of the oscillators O1 and O2 and preset duty ratios of the PWM circuits P1 and P2.

Figure 5:
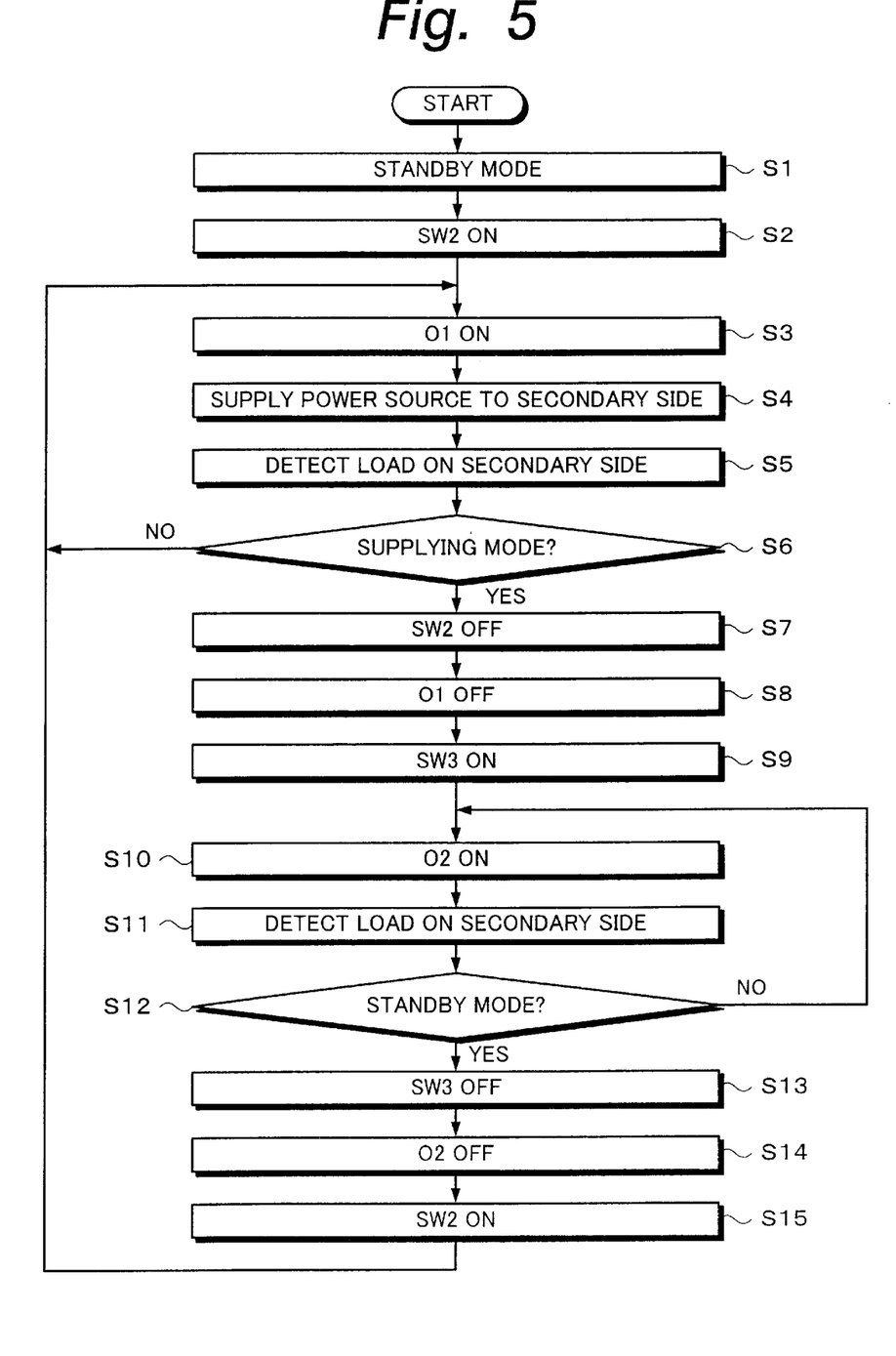
FIG. 5 is a flowchart for explaining an example of the operation of the invention.

FIG. 5 shows a flowchart for explaining the operations in the second, third, and fourth embodiments mentioned above. In step S1, a commercially available power source is first supplied and the power supply apparatus operates in the standby mode. In step S2, the switching circuit SW2 is turned on in order to make the oscillator O1 having the frequency f1 for the standby mode operative.

In step S3, the oscillator O1 operates. In step S4, the power source is supplied from the secondary coil T2 to the secondary side load. In step S5, an electronic apparatus connected to the secondary coil T2 is detected by the detecting unit. In step S6, whether the operating mode is the supply mode or not is discriminated from a result of the detection. If it is determined that the operating mode is the supply mode, the control advances to step S7. If it is decided that the operating mode is the standby mode, the control is returned to step S3. In step S7, the switching circuit SW2 is turned off in order to switch the operating mode from the standby mode to the supply mode. In step S8, the operation of the oscillator O1 is stopped.

In step S9, the switching circuit SW3 is turned on. In step S10, the oscillator O2 is made operative. In step S11, the electronic apparatus connected to the secondary coil T2 is detected by the detecting unit. In step S12, whether the operating mode is the standby mode or not is discriminated from a result of the detection. If it is determined that the operating mode is the standby mode, the control advances to step S13. If it is determined that the operating mode is the supply mode, the control is returned to step S10. In step S13, the switching circuit SW3 is first turned off in order to switch the operating mode from the supply mode to the standby mode. In step S14, the operation of the oscillator O2 is stopped. In step S15, the switching circuit SW2 is turned on. The control is returned to step S3.

In the flowchart, when the power supply is turned on, the control is started in the standby mode. However, the control can be also started in the supply mode. In this case, the control is started from step S9.

Figure 6A:
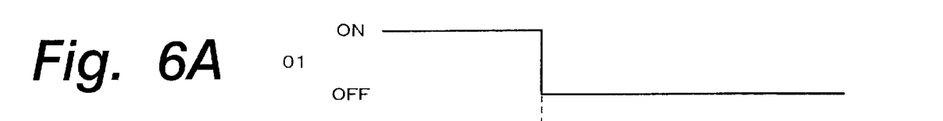
FIGS. 6A and 6B are timing charts for explaining an example of the operation of the invention.
Figure 6B:
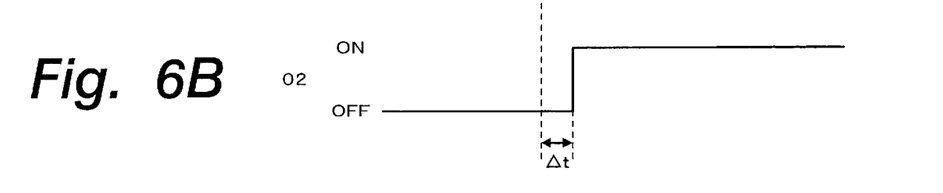

FIGS. 6A and 6B show timings of an example of the operation and the stop of the operation of each of the oscillators O1 and O2. In the foregoing embodiments, when the operating mode is switched from the standby mode to the supply mode or when it is switched from the supply mode to the standby mode, the operation of one of the oscillators O1 and O2 is stopped (OFF) and, thereafter, the other is made operative (ON). As shown in FIGS. 6A and 6B, however, a period Δt during which neither the oscillator O1 nor the oscillator O2 operates can be also provided. That is, the oscillator O2 is made operative after the elapse of the period Δt after the stop of the operation of the oscillator O1 as shown in FIGS. 6A and 6B. By providing such a period Δt, the operation of the switching device X can be stabilized more.

Figure 7:
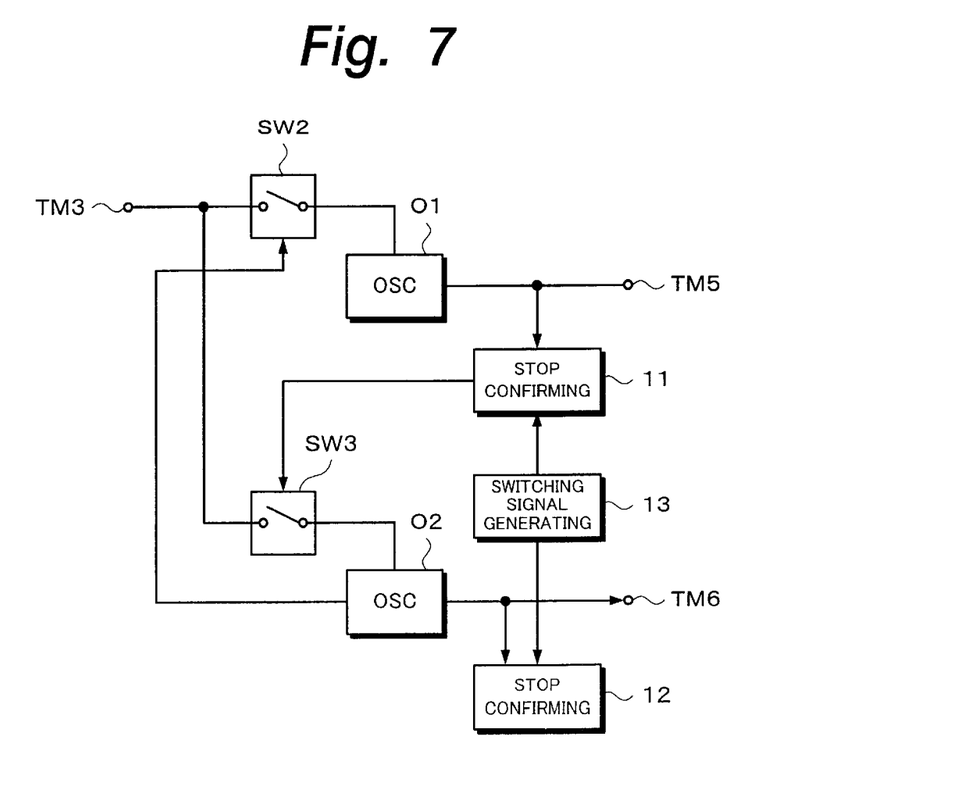
FIG. 7 is a block diagram of the fifth embodiment to which the invention is applied.

The fifth embodiment to which the invention is applied will be described with reference to FIG. 7. According to the fifth embodiment, the outputs of the oscillators O1 and O2 are detected and the operation and the stop of the operation of each of the oscillators O1 and O2 are switched at the timings shown in FIGS. 6A and 6B.

The frequency f1 which is generated from the oscillator O1 is supplied to a terminal TM5 and a stop confirming circuit 11. The frequency f1 supplied to the terminal TM5 is supplied to the PWM circuit P1 or P. When a standby mode switching signal is supplied from a switching signal generating circuit 13 to the switching circuit SW2 via a stop confirming circuit 12, the switching circuit SW2 is turned off. After the elapse of the period Δt, the stop confirming circuit 11 confirms whether the operation of the oscillator O1 has been stopped or not. After confirming the stop of the operation of the oscillator O1, a control signal is supplied to the switching circuit SW3 through the stop confirming circuit 11 so as to turn on the switching circuit SW3.

Similarly, the frequency f2 which is generated from the oscillator O2 is supplied to a terminal TM6 and the stop confirming circuit 12. The frequency f2 supplied to the terminal TM6 is supplied to the PWM circuit P2 or P. When a supply mode switching signal is supplied from the switching signal generating circuit 13 to the switching circuit SW3 through the stop confirming circuit 11, the switching circuit SW3 is turned off. After the elapse of the period Δt, the stop confirming circuit 12 confirms whether the operation of the oscillator O2 has been stopped or not. After confirming the stop of the operation of the oscillator O2, a control signal is supplied to the switching circuit SW2 through the stop confirming circuit 12 so as to turn on the switching circuit SW2.

When the switching circuit SW2 or SW3 is turned on, the rectified commercially available power source is supplied through the terminal TM3. The rectified commercially available power source is supplied to the oscillator O1 or O2 through the switching circuit SW2 or SW3.

Figure 8:
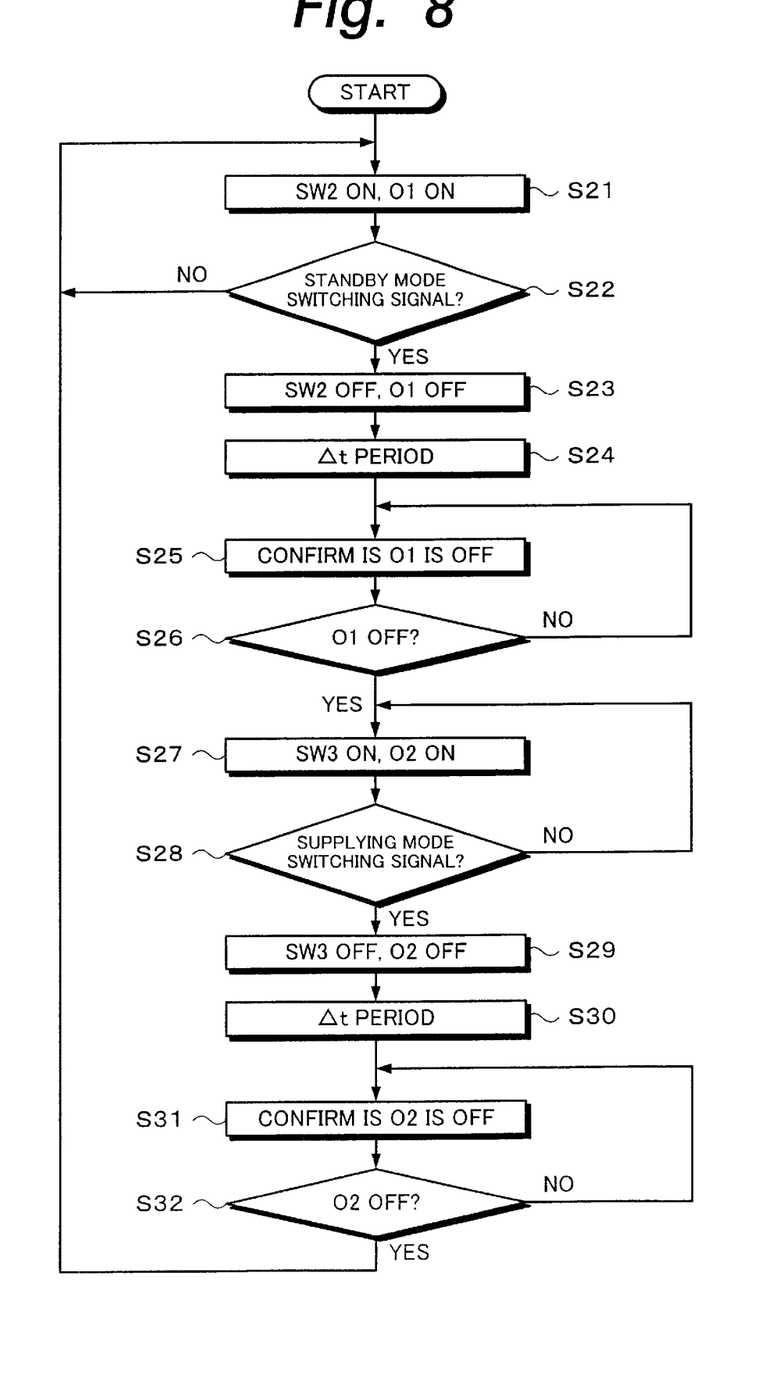
FIG. 8 is a flowchart for explaining an example of the operation of the fifth embodiment.

FIG. 8 shows a flowchart for explaining an example of the operation of the fifth embodiment. In step S21, the switching circuit SW2 is turned on and the oscillator O1 is made operative. That is, the power supply apparatus operates in the standby mode. In step S22, whether the signal supplied from the switching signal generating circuit 13 is a standby mode switching signal or not is discriminated. If it is determined that the signal is the standby mode switching signal, the control advances to step S23. If it is determined that the signal is not the standby mode switching signal, the control is returned to step S21. In step S23, the switching circuit SW2 is turned off and the operation of the oscillator O1 is stopped. In step S24, the signal is delayed by the Δt period. After that, in step S25, the stop of the operation of the oscillator O1 is confirmed by the stop confirming circuit 11. In step S26, whether the operation of the oscillator O1 has been stopped or not is discriminated by the stop confirming circuit 11. If it is determined that the operation has been stopped, the control advances to step S27. If it is determined that the oscillator O1 is still operating, the control is returned to step S25.

In step S27, the switching circuit SW3 is turned on and the oscillator O2 is made operative. That is, the power supply apparatus operates in the supply mode. In step S28, whether the signal supplied from the switching signal generating circuit 13 is a supply mode switching signal or not is discriminated. If it is determined that the signal is the supply mode switching signal, the control advances to step S29. If it is determined that the signal is not the supply mode switching signal, the control is returned to step S27. In step S29, the switching circuit SW3 is turned off and the operation of the oscillator O2 is stopped. In step S30, the signal is delayed by the Δt period. After that, in step S31, the stop of the operation of the oscillator O2 is confirmed by the stop confirming circuit 12. In step S32, whether the operation of the oscillator O2 has been stopped or not is discriminated by the stop confirming circuit 12. If it is decided that the operation has been stopped, the control is returned to step S21. If it is determined that the oscillator O2 is still operating, the control is returned to step S31.

Figure 9:
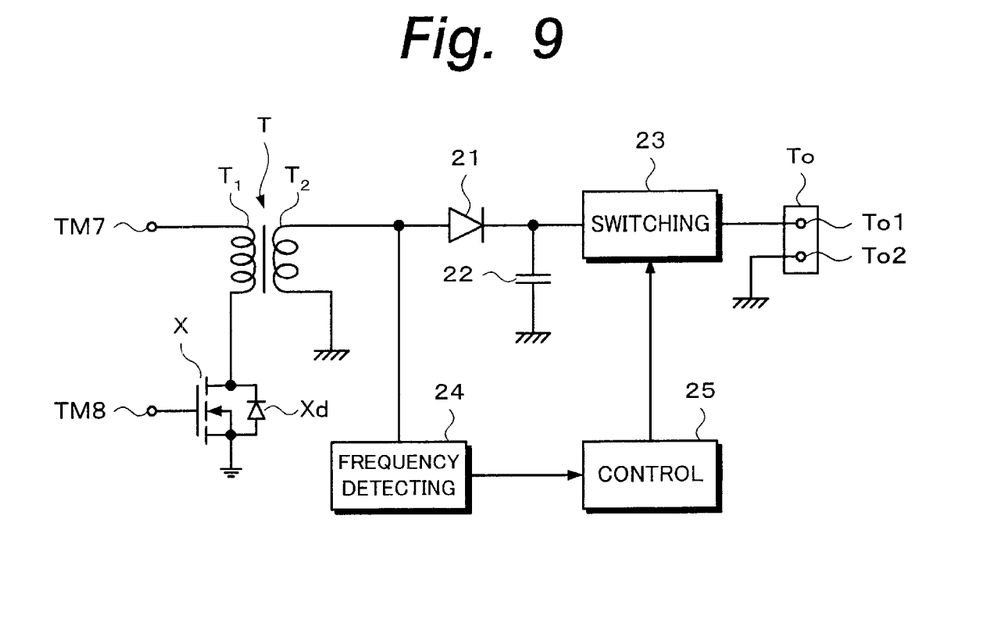
FIG. 9 is a block diagram of an example on the secondary coil T2 side to which the invention is applied.

FIG. 9 shows an example of a circuit construction on the secondary side of the transformer T. The rectified commercially available power source is supplied to one end of the primary coil T1 through a terminal TM7. The switching device X is provided between the other end of the primary coil T1 and the ground. A switching signal which is generated from the driving circuit D, D1, or D2 is supplied to the control terminal of the switching device X through a terminal TM8. A rectifying circuit comprising a diode 21 and a capacitor 22 is provided at one end of the secondary coil T2. The other end of the secondary coil T2 is connected to the ground. One end of the secondary coil T2 is connected to a frequency detecting circuit 24.

Figure 10:
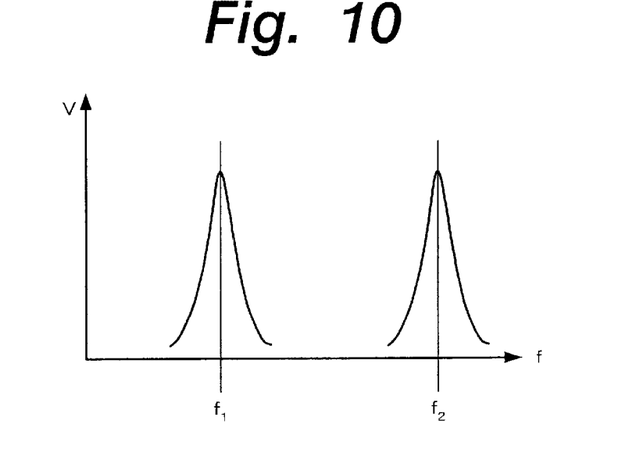
FIG. 10 is a schematic diagram for use in explanation of the invention.

The frequency detecting circuit 24 detects a frequency of a pulse signal which is generated at one end of the secondary coil T2. The frequency detecting circuit 24 discriminates whether the apparatus is operating in the standby mode or the supply mode. For example, the frequencies f1 and f2 are detected as shown in FIG. 10. A control circuit 25 controls the on/off operations of a switching circuit 23 in accordance with a result detected by the frequency detecting circuit 24. When the switching circuit 23 is ON, the power source is supplied to the electronic apparatus through an output terminal T0.

The fact that the operation and the stop of the operation of each of the oscillators O1 and O2 have been switched on the primary coil T1 side is detected on the secondary coil T2 side. The switching circuit 23 is turned on/off so that the operating mode is set to the mode according to the detected frequencies. Specifically speaking, when the frequency f1 is detected, the operating mode is recognized as a standby mode, and the switching circuit 23 is turned off. When the frequency f2 is detected, the operating mode is recognized as a supply mode, and the switching circuit 23 is turned on.

Figure 11:
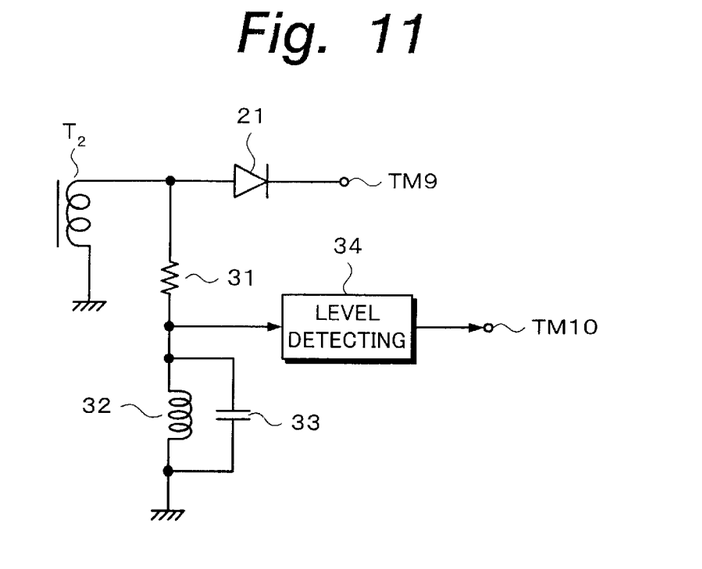
FIG. 11 is a block diagram of another example on the secondary coil T2 side to which the invention is applied.

FIG. 11 shows a specific construction of the frequency detecting circuit 24. In this example, the frequency detecting circuit 24 is constructed by a parallel resonance circuit and a level detecting circuit 34. The parallel resonance circuit comprises a resistor 31, an inductor 32, and a capacitor 33 and is inserted between the secondary coil T2 and the ground. A level signal is supplied to the level detecting circuit 34 from a node of the resistor 31 and inductor 32. For example, in the parallel resonance circuit, when the frequency of the supplied pulse signal is equal to f1, the level signal which is supplied to the level detecting circuit 34 also approaches zero most. Therefore, when the level signal of a predetermined value or less is supplied, the level detecting circuit 34 determines that the operating mode is the standby mode. The signal is supplied to the control circuit 25 through a terminal TM10 so as to turn off the switching circuit 23.

Figure 12:
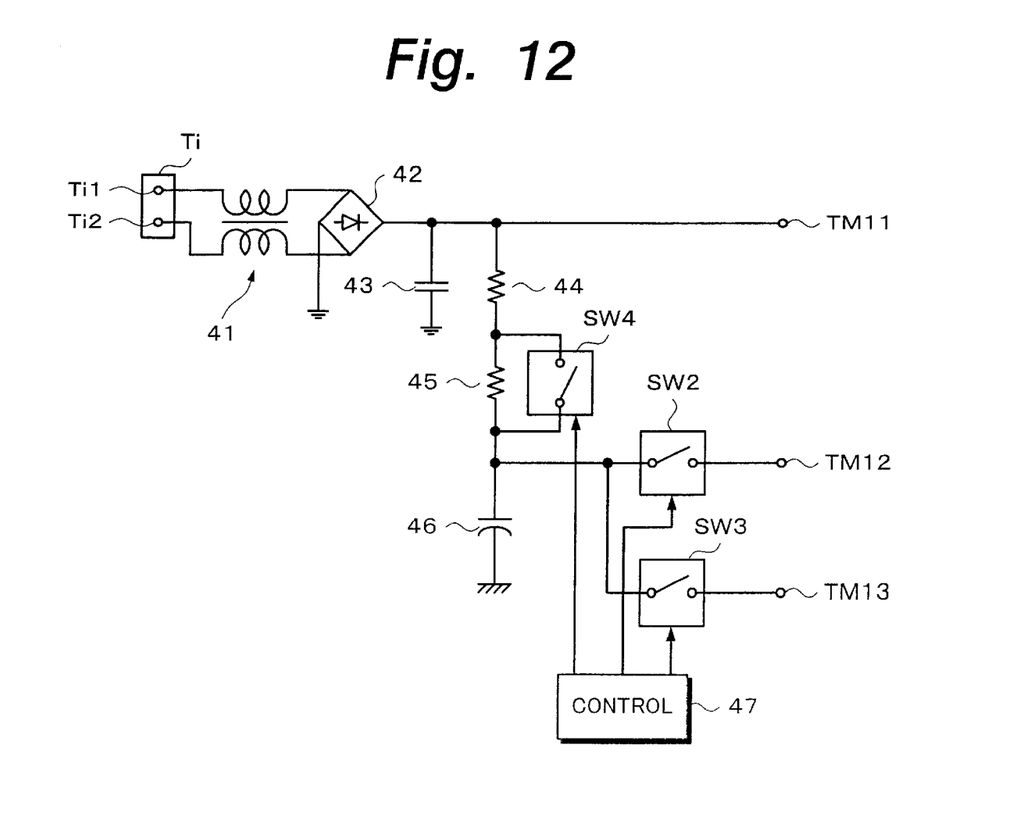
FIG. 12 is a block diagram of an example of switching a power source which is applied to the invention.

Subsequently, an example of switching a time constant when the power source is supplied to the oscillators O1 and O2, PWM circuits P1 and P2, and driving circuits D1 and D2 will be described with reference to FIG. 12. The commercially available power source is supplied from an input terminal T1. The supplied commercially available power source is supplied to a terminal TM11 through a rectifying circuit comprising a filter 41, a diode bridge 42, and a capacitor 43. The terminal TM11 is connected to one end of the primary coil T1. Resistors 44 and 45 and a capacitor 46 are serially inserted between the terminal TM11 and the ground. A switching circuit SW4 is inserted in parallel with the resistor 45. The switching circuit SW4 is controlled by a control circuit 47. The control circuit 47 controls the on/off operations of the switching circuits SW2 and SW3.

In this example, the switching circuits are controlled by the control circuit 47 in a manner such that when the switching circuit SW2 is turned on, the switching circuits SW3 and SW4 are turned off, and when the switching circuit SW2 is turned off, the switching circuits SW3 and SW4 are turned on. A value of a time constant CR is changed as mentioned above. When the switching circuit SW2 is turned on, the power source is supplied through a terminal TM12 to the oscillator O1, PWM circuit P1 or P, and driving circuit D1 or D. When the switching circuit SW3 is turned on, the power source is supplied through a terminal TM13 to the oscillator O2, PWM circuit P2 or P, and driving circuit D2 or D.

The frequency f1 of the oscillator O1 is compared with the frequency f2 of the oscillator O2. If f1<<f2, although an impedance of the driving circuit D1 can be set to be high, an impedance of the driving circuit D2 needs to be low. In case of the supply mode, a power of the driving circuit D2 is necessary. Therefore, in the supply mode, by turning on the switching circuit SW4, the resistor 45 is short-circuited and the time constant upon activation is set to be smaller than that in the standby mode. Thus, the power of the driving circuit D2 can be increased upon activation.

Figure 13:
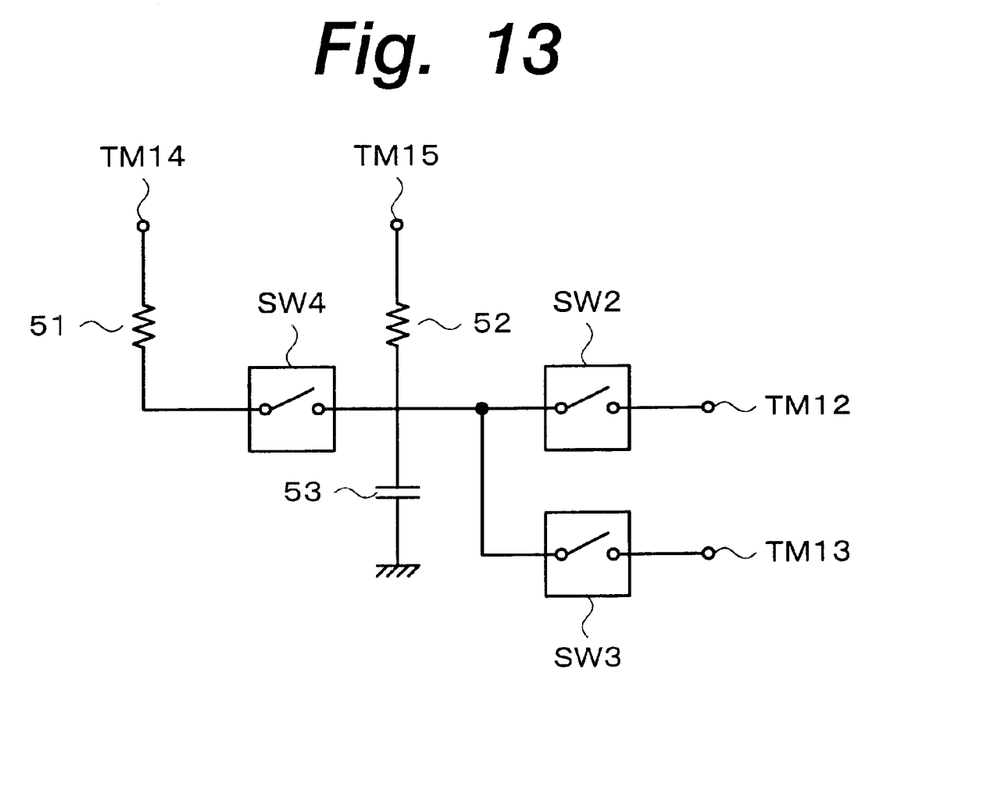
FIG. 13 is a block diagram of another example of switching a power source which is applied to the invention.

Another example of switching the time constant when the power source is supplied to the oscillators O1 and O2, PWM circuits P1 and P2, and driving circuits D1 and D2 will subsequently be described with reference to FIG. 13. Terminals TM14 and TM15 are connected to the terminal TM11 shown in FIG. 12 and the rectified commercially available power source is supplied to those terminals. The terminal TM14 is connected to the switching circuit SW4 through a resistor 51. The terminal TM15 is connected to the switching circuit SW4 through a resistor 52. The switching circuit SW4 is inserted between the resistors 51 and 52. A capacitor 53 is inserted between the resistor 52 and the ground. The power source is supplied to the switching circuits SW2 and SW3 from a node of the resistor 52 and capacitor 53.

In this instance, it is assumed that resistances of the resistors 51 and 52 are set to R51 and R52, and they are compared. Assuming that $$R51 \ll R52,$$

by turning on the switching circuit SW4, a synthetic resistance of the resistors 51 and 52 is obtained and the time constant upon activation can be increased to a value larger than that at the time of the turn-off of the switching circuit SW4. Therefore, in another example of FIG. 13, the switching circuits are controlled in a manner such that when the switching circuit SW2 is turned on, the switching circuit SW4 is turned on and the switching circuit SW3 is turned off. The switching circuits are controlled in a manner such that when the switching circuit SW2 is turned off, the switching circuit SW4 is turned off and the switching circuit SW3 is turned on.

In the embodiment, although an FET is connected as an example of the switching device X to the other end of the primary coil T1, a transistor can be also connected instead of the FET. That is, any device can be used so long as it can perform the switching operation.

In the embodiment, to reduce the electric power consumption in the standby mode, the frequency f1 of the oscillator O1 in the standby mode is set to be lower than the frequency f2 of the oscillator O1 in the supply mode, and the duty ratio of the PWM circuit P1 in the standby mode is set to be smaller than the duty ratio of the PWM circuit P2 in the supply mode. However, the oscillator O1 in the standby mode can be also intermittently made operative. As mentioned above, in the standby mode, it is sufficient to supply the power source by which at least the secondary side load connected to the secondary coil T2 can operate.

One of the control of the frequency f1 of the oscillator O1 and the duty ratio of the PWM circuit P1 and the intermittent operation of the oscillator O1 can be also performed in the standby mode or both of the operation and the control can be also executed.

According to the invention, since the oscillator that is optimum to the supply mode and the standby mode is used and, further, the power source can be supplied only to the oscillator according to the mode, the electric power consumption in the standby mode can be suppressed. Further, since the oscillators in the supply mode and the standby mode can be freely selected, the power supply apparatus of a small electric power can be designed.

The present invention is not limited to the foregoing embodiments but many modifications and variations are possible within the spirit and scope of the appended claims of the invention.

What is claimed is:

1. A power supply apparatus for outputting a predetermined power source from a commercially available power source, wherein:

a primary side of a transformer is provided with first and second oscillators for generating outputs of different frequencies and different duty ratios and a switching unit for switching on the basis of the output of one of said first and second oscillators;

a secondary side of said transformer is provided with a rectifying circuit for rectifying an output of said switching unit and forming an output and detecting means for detecting a standby mode and a supply mode; and one of said first and second oscillators is selected in accordance with a result of the detection of said detecting means.

2. An apparatus according to claim 1, wherein switching means is further provided between said first and second oscillators and said switching unit.

3. An apparatus according to claim 1, wherein switching means is further provided for a power supply path of said first oscillator and a power supply path of said second oscillator.

4. An apparatus according to claim 1, wherein said switching unit comprises driving means and a switching device.

5. An apparatus according to claim 4, wherein said driving means comprises first driving means to which the output of said first oscillator is supplied and second driving means to which the output of said second oscillator is supplied, and switching means is provided between said first and second driving means and said switching device.

6. An apparatus according to claim 1, further comprising stop confirming means for confirming the stop of the operations of said first and second oscillators from the outputs of said first and second oscillators.

7. An apparatus according to claim 1, wherein a period of time during which said first and second oscillators do not operate is provided when the operation and the stop of the operation of each of said first and second oscillators are switched.

8. An apparatus according to claim 1, wherein a time constant and switching means for changing a value of said time constant are provided on power supply paths of said first and second oscillators, when one of said first and second oscillators is selected, said switching means is turned on, and when the other is selected, said switching means is turned off.

9. An apparatus according to claim 1, wherein the secondary side of said transformer is provided with frequency detecting means for detecting a frequency of a power source which is outputted from said transformer and switching means provided between said transformer and a load, and in said frequency detecting means, when a frequency corresponding to said first frequency is detected, said switching means is turned on, and when a frequency corresponding to said second frequency is detected, said switching means is turned off.

* * * * *